(12) United States Patent
Defranciscis et al.

(10) Patent No.: US 10,873,252 B2
(45) Date of Patent: Dec. 22, 2020

(54) TURNING DEVICE FOR A TURBOMACHINE

(71) Applicant: Nuovo Pignone Tecnologie Srl, Florence (IT)

(72) Inventors: Sergio Defranciscis, Florence (IT); Lorenzo Naldi, Florence (IT); Duccio Fioravanti, Florence (IT); Massimiliano Ortiz Neri, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 15 days.

(21) Appl. No.: 15/772,412

(22) PCT Filed: Oct. 27, 2016

(86) PCT No.: PCT/EP2016/075928
§ 371 (c)(1),
(2) Date: Apr. 30, 2018

(87) PCT Pub. No.: WO2017/072231
PCT Pub. Date: May 4, 2017

(65) Prior Publication Data
US 2018/0320557 A1 Nov. 8, 2018

(30) Foreign Application Priority Data
Oct. 30, 2015 (IT) .................... 102015000067342

(51) Int. Cl.
*H02K 49/04* (2006.01)
*H02K 7/104* (2006.01)
(Continued)

(52) U.S. Cl.
CPC ........... *H02K 49/046* (2013.01); *F01D 25/36* (2013.01); *H02K 1/182* (2013.01); *H02K 7/104* (2013.01); *H02K 7/20* (2013.01); *H02K 49/04* (2013.01)

(58) Field of Classification Search
CPC .......... F01D 25/36; H02K 7/104; H02K 7/20; H02K 7/003; H02K 49/04; H02K 49/00;
(Continued)

(56) References Cited

U.S. PATENT DOCUMENTS 3,840,764 A * 10/1974 Burger ................. D06F 37/304
310/185
3,919,894 A 11/1975 Keeter et al.
(Continued)

FOREIGN PATENT DOCUMENTS

DE    1 231 344 B    12/1966
EP    1 443 189 A1    8/2004
(Continued)

OTHER PUBLICATIONS

Italian Search Report and Written Opinion issued in connection with corresponding IT Application No. 102015000067342 dated Jul. 25, 2016.
(Continued)

*Primary Examiner* — Quyen P Leung
*Assistant Examiner* — Alexander A Singh
(74) *Attorney, Agent, or Firm* — Baker Hughes Patent Org.

(57) ABSTRACT

A turning device for a turbomachine comprises a plurality of electromagnets connectable to an electric power source; a rotor magnetically coupled with the electromagnets, connectable to a main shaft of the turbomachine and having a rotation axis, the electromagnets are arranged facing the rotor in order to induce eddy currents on a surface of the rotor and apply a torque to the rotor, thus rotating the main shaft.

16 Claims, 2 Drawing Sheets

(51) Int. Cl.
*H02K 7/20* (2006.01)
*H02K 1/18* (2006.01)
*F01D 25/36* (2006.01)

(58) Field of Classification Search
CPC ...... H02K 49/046; H02K 17/00; H02K 17/02;
H02K 17/04; H02K 17/06; H02K 17/08;
H02K 17/10; H02K 17/12; H02K 17/14;
H02K 7/10; H02K 7/1004; H02K 7/1008;
H02K 7/1012; H02K 7/1016; H02K
7/106; H02K 7/114; H02K 7/116; H02K
1/182; F02B 39/10
See application file for complete search history.

(56) References Cited

U.S. PATENT DOCUMENTS

| | | | | |
|---|---|---|---|---|
| 6,700,265 B1* | 3/2004 | Bouissou | ............. | H02K 49/043 310/105 |
| 2004/0123603 A1 | 7/2004 | Care et al. | | |
| 2005/0140230 A1* | 6/2005 | Johnson | ................... | B60K 6/26 310/112 |
| 2011/0203271 A1* | 8/2011 | Spooner | ................. | F01D 15/10 60/607 |
| 2014/0346777 A1* | 11/2014 | Blanchet | .................. | H02K 5/12 290/54 |

FOREIGN PATENT DOCUMENTS

| | | |
|---|---|---|
| GB | 1 147 730 A | 4/1969 |
| RU | 2064081 C1 | 7/1996 |
| RU | 2012127784 A | 1/2014 |

OTHER PUBLICATIONS

International Search Report and Written Opinion issued in connection with corresponding PCT Application No. PCT/EP2016/075928 dated Jan. 18, 2017.
International Preliminary Report on Patentability issued in connection with corresponding PCT Application No. PCT/EP2016/075928 dated May 1, 2018.

* cited by examiner

TURNING DEVICE FOR A TURBOMACHINE

BACKGROUND OF THE INVENTION

The present disclosure relates to a turning device for a turbomachine. Namely, the present disclosure relates to a device which is applied to a shaft of a turbomachine in order to keep such turbomachine rotating at low speed during production inactivity. This is done for several reasons, for example to prevent the shaft of the turbomachine from bending under the weight of the rotors. Also, especially in the field of steam turbines, the turning device is used to avoid shaft deformation after a shut-down during the cool-down phase and before the start-up when the steam is injected into the seals with the inlet valve closed.

In detail the turning device from the state of the art, also known as turning gear, comprises an electrical motor connected to a secondary shaft. A mechanical transmission is adapted to connect the secondary shaft to the primary shaft of the turbomachine, namely the shaft to which the rotating components exchanging power with the working fluid are attached. Such mechanical transmission can be, for example, a swiveling pinion in which a pinion engages a gear when necessary and disengages when it is not. The pinion can be brought into engagement by a rotating arm. Alternatively, the turning gear may be of the clutch type.

Since the turning gear is used when the turbomachine is either deactivated or is starting up, it must then be disengaged prior to enabling the normal function of the turbomachine. However, the mechanical transmission can sometimes fail, leading to jamming of the turbomachine.

Furthermore, the turning gear can conceivably engage while the turbomachine is running at full speed. This poses a safety hazard, since in such condition the turning gear rotating elements would be subject to excessive dynamic loads and shocks that may lead to turbomachine catastrophic failure, ejecting parts and risking injuries to the personnel around it.

SUMMARY OF THE INVENTION

One embodiment of the invention therefore relates to a turning device for a turbomachine. The turning device comprises a plurality of electromagnets connectable to an electric power source. A rotor is magnetically coupled with the electromagnets, and is connectable to a main shaft of the turbomachine. The rotor has a rotation axis.

The electromagnets are arranged facing the rotor in order to induce eddy currents on the rotor surface.

The modulation of the currents flowing into the electromagnets coils generates variable magnetic fluxes, which induce electric currents on the rotor surface. These eddy currents produce magnetic fluxes that tend to react to the cause of the variation. Thus, the electromagnets, properly dimensioned, are able to induce a torque to the rotor capable to put the main shaft in rotation.

In an embodiment, this is a completely contactless version of the turning gear. Therefore it overcomes all of the safety problems, since the device does not need a physical engagement in order to work. Indeed, the turning device according to the above mentioned embodiment, cannot jam and does not require lubrication.

Also, the safety of the device is greatly improved over the turning gear, as it does not pose a safety risk since it cannot be accidentally engaged while the turbomachine is active. Indeed, the turning device just described operates in a completely contactless torque transmission therefore, even if an accidental engagement were to happen, there would be no risks for the machine operator or persons nearby.

In an embodiment, the above described turning device can be optionally used as a brake.

BRIEF DESCRIPTION OF THE DRAWINGS

Further details and specific embodiments will refer to the attached drawings, in which.

DETAILED DESCRIPTION

Figure 1:
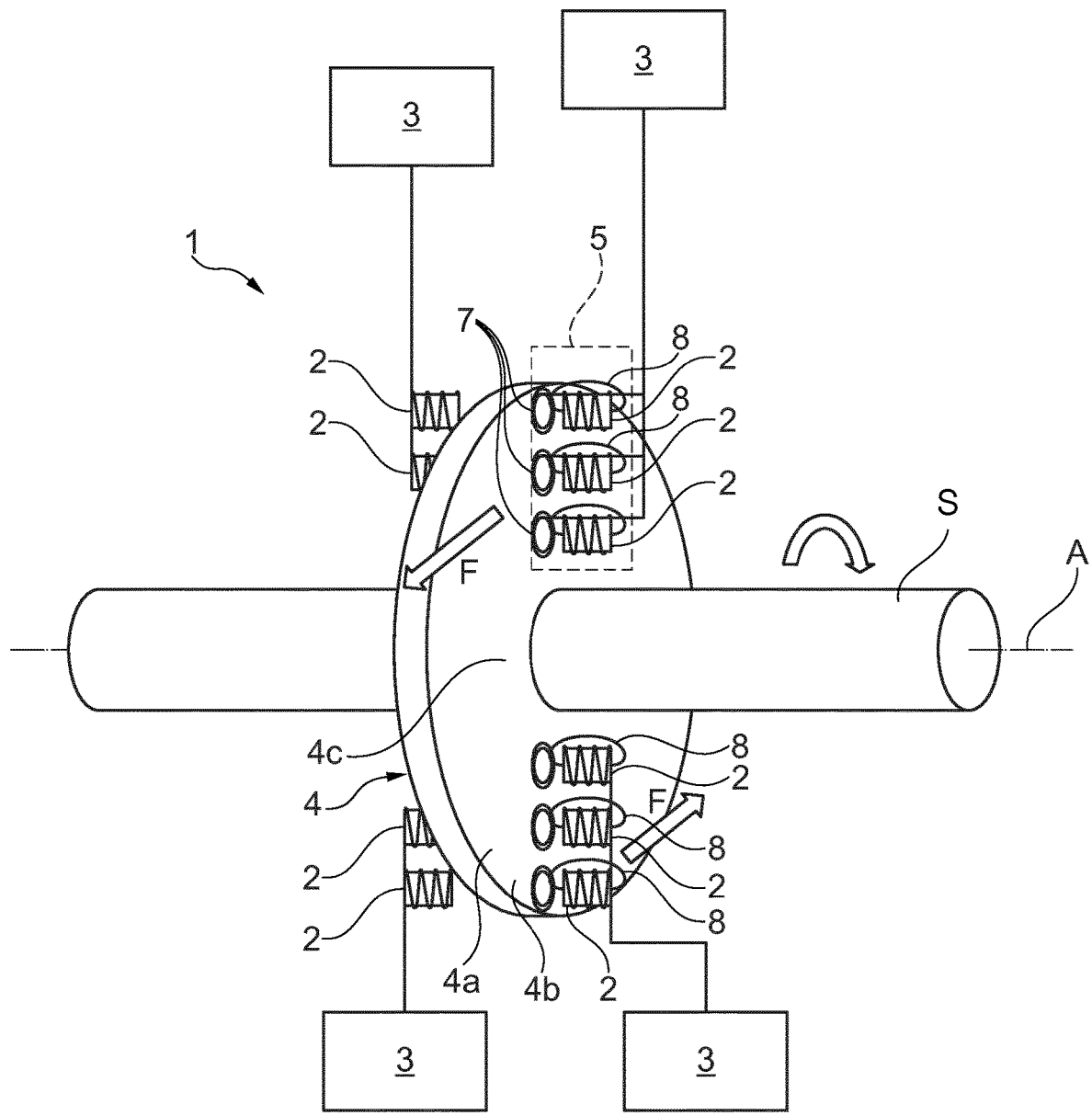
FIG. 1 is a schematic representation of a turning device according to an embodiment of the present invention.

The following description of exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a turning device for a turbomachine.

The device 1 comprises a plurality of electromagnets 2. These electromagnets are connectable to an electric power source 3. Moreover, the electromagnets 2 define a stator of the device 1, thus they are attached to a fixed portion of the structure of the turbomachine (not shown in the drawings). Further details on the electromagnets 2 and the power source 3 will be given in a subsequent part of the present disclosure.

A rotor 4 is magnetically coupled with the electromagnets 2. The rotor 4 is connectable to a main shaft "S" of the turbomachine.

With additional detail, the rotor 4 has a rotation axis "A". The rotor 4 is, in an embodiment, disc shaped. Therefore, the rotor has a central zone 4c around the rotation axis "A" and a peripheral zone 4b located externally with respect to the rotation axis "A". In other words, the peripheral zone 4b is located externally with respect to the central zone 4c.

The rotor 4 also has two surfaces 4a, opposite to each other. The surfaces 4a are substantially flat. Also, the surfaces 4a are arranged substantially perpendicularly with respect to the rotation axis "A".

The rotor 4 itself is made of an electrically conductive but non magnetic material. For example, such material can be Inconel or steel.

Concerning the above mentioned electromagnets 2, it is to be noted that they are arranged facing the rotor 4 in order to induce eddy currents 7 on the surface 4a of the rotor 4. As a consequence, a torque is applied onto the rotor 4, and is transferred from the rotor 4 to the main shaft "S", thus rotating the main shaft "S". Indicatively, such torque can be estimated as between 500 Nm for smaller turbomachines and 60000 Nm for the largest models currently in production.

With particular reference to FIG. 1, the rotor 4 is shown together with electromagnets 2. The electromagnets 2 are arranged so that their north-south axis—i.e. the axis of the coils—is substantially perpendicular to the rotor 4. A magnetic field 8 is shown as crossing the rotor 4. Indeed, the modulation of the currents flowing into the coils of the electromagnets 2 generates variable magnetic fluxes, which induce the above mentioned electric eddy currents 7 on the surfaces 4a of the rotor 4. These eddy currents 7 produce magnetic fluxes that, by reacting with the magnetic field 8, propel the rotor 4 as needed. In other words, as an effect of the superficial eddy currents 7, the portion of the surface 4a of the rotor 4 on which they are located is provided with a magnetic field (not shown in the drawings) which then interacts with the magnetic field from the electromagnets 2. In order to perform in this way, the electrical power source 3 has to provide a rotating alternated current to the electromagnets 2, so that their magnetic field 8 is correctly phased. More details will be given in a following part of this disclosure.

With more detail, the device 1 comprises at least two sets 5 of electromagnets 2. Each set 5 comprises at least one electromagnet 2. Each set 5 is located at a respective angular position with respect to the rotation axis "A" of the rotor 4. With reference to FIG. 1, two sets 5 of electromagnets 2 are shown, separated by a 180° angle. Should any more of the sets 5 of magnets 2 be needed, they will be, in an embodiment, arranged in an angularly equally spaced fashion, namely with having the same angle between any two consecutive radial directions.

Indeed, the electromagnets 2 are configured to apply the torque along a predefined direction of rotation of the main shaft "S", in order to accelerate the main shaft "S". Therefore, the turning device 1 can keep the turbomachine in a low rotation while not in use. By the word "low rotation", according to the present disclosure, it is meant a non operating rotation at most of 300 rpm, typically 20 rpm. In a typical application, the low rotation is maintained for at least 10 minutes before the machine startup and maximum 100 hours after the machine operation.

With additional detail, the set of electromagnets 2 is rated for a total electric power consumption comprised between 1000 W and 150000 W.

In order to induce the eddy currents 7, each electromagnet 2 is placed close to the surface 4a of the rotor 4. The distance can be estimated as comprised between 1 mm and 2 mm.

As shown in FIG. 1, two electromagnets 2 can be active on the same spot of the rotor 4, each being placed opposite to the other with respect to the rotor 4 and facing a respective surface 4b of the rotor 4. In an embodiment, this helps balancing the load on the rotor 4.

With additional detail, it is to be noted that each set 5 is configured to act at least on the peripheral zone 4b of the rotor 4, in other words the zone of the rotor 4 further from the rotation axis "A". In an embodiment, this allow to maximize the torque produced by each electromagnet. Optionally, each set 5 can also act on the central zone 4c of the rotor 4. In an embodiment, this allow to spread the load on the rotor 4 more evenly along the radial direction of the rotor 4.

As shown in FIG. 1, each set 5 comprises several electromagnets 2 arranged along a radial direction of the rotor 4. In further embodiment of the invention, not shown in the drawings, the electromagnets 2 can be arranged in whatever way is more convenient.

Each set 5 is configured to be powered by a respective phase of an input electric current. In an embodiment, as shown in FIG. 1, each set 5 of electromagnets 2 shares a single electric power source 3. These electric power sources 3 are phased differently, depending on the total number of sets 5 of electromagnets 2. In an embodiment, having at least two electric power source 3, namely at least two electric phases, allows the device 1 to start itself from a rest condition.

Another embodiment of the invention has a rotor 4 which is hollow. In an embodiment, this allows to have a lighter rotor 4 that would otherwise be possible, while the device 1 can still work, since the eddy currents 7 are generated only on the surface 4a facing the electromagnets 2, and do not go very deep inside the rotor 4 itself.

Figure 2:
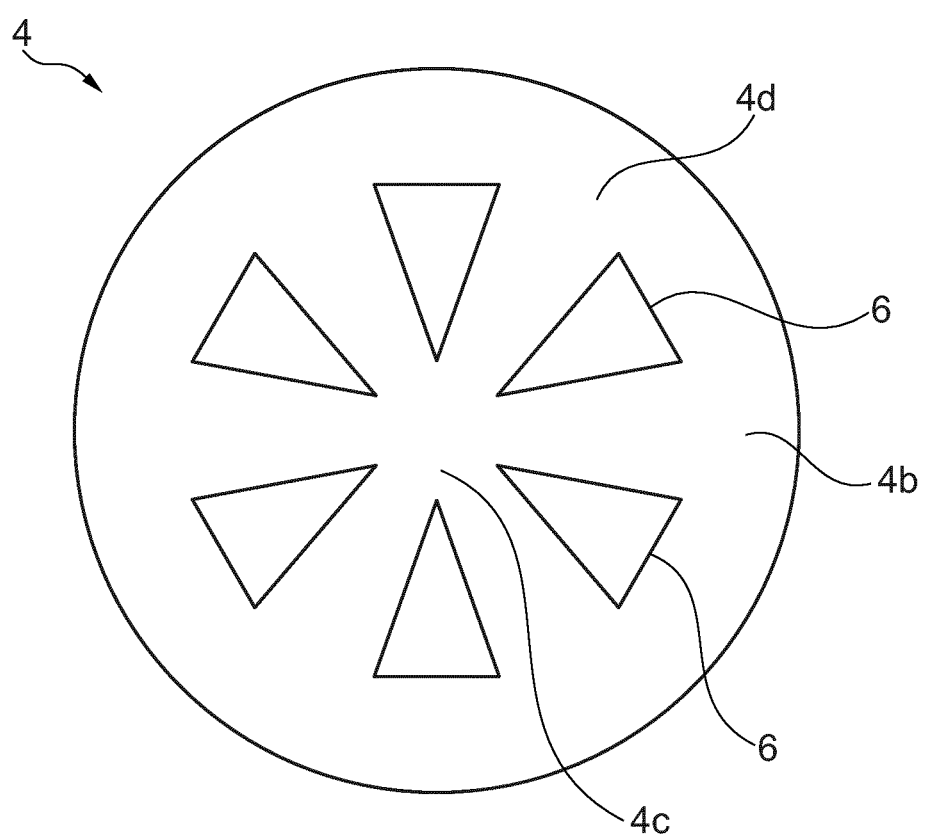
FIG. 2 is a detail of the turning device of FIG. 1.

In an embodiment, the rotor 4 has a plurality of holes 6. In an embodiment, these holes 6 allow to optimize both the rotor 4 weight and cooling. One example of patter of holes 6 is shown in FIG. 2. Accordingly, other patterns of holes 6 may be applied to the rotor 4, following design optimization. Indeed, in the embodiment shown in FIG. 1 both the rotor 4 and electromagnets 2 are designed to be passively gas cooled. In other embodiments, not shown in the drawings, the rotor 4 and the electromagnets 2 are designed to be actively gas cooled or liquid cooled.

In addition, the electromagnets 2 can optionally be configured to apply the torque opposite to the predefined direction of rotation of the main shaft "S", in order to slow down the main shaft "S". In other words, this allows the turning device 1 to be used as a brake for the turbomachine onto which it is installed. In an embodiment, it is only necessary to have a power source 3 that provides a constant voltage to obtain this effect, since the variation of the magnetic field 8 is given by the motion of the rotor 4 itself. In this case, the eddy currents generated on the surfaces 4a of the rotor 4 are such that they generate a magnetic field that tend to counter the rotation of the rotor 4. This effect is directly proportional to the rotation speed of the rotor 4, thus giving the effect of viscous friction on the rotor 4.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turning device for a turbomachine, the turning device comprising:
   a rotor connectable to a shaft of the turbomachine and having a rotation axis and two surfaces forming opposite sides of the rotor; and
   at least two sets of electromagnets connectable to an electric power source, at least one of the at least two sets of electromagnets acts on one of the two surfaces of the rotor and at least another of the at least two sets of electromagnets acts on the other of the two surfaces of the rotor, and at least one of the at least two sets of electromagnets comprises at least one first electromagnet arranged to act on a peripheral zone of one of the two surfaces of the rotor relative to the rotation axis at least one second electromagnet arranged to act on a central zone of the one of the two surfaces of the rotor relative to the rotation axis and at least one third electromagnet arranged between the at least one first electromagnet and the at least one second electromagnet, wherein the rotor is configured to be magnetically coupled to the at least two sets of electromagnets and the at least two sets of electromagnets are arranged in proximity of the rotor in order to induce eddy currents on the two surfaces of the rotor and apply a torque to the rotor to rotate the shaft of the turbomachine.

2. The turning device according to claim 1, wherein the electromagnets are configured to apply the torque along a predefined direction of rotation of the main shaft in order to accelerate the main shaft.

3. The turning device according to claim 1, wherein the electromagnets are configured to apply the torque opposite to a predefined direction of rotation of the main shaft in order to slow down the main shaft.

4. The turning device according to claim 1, wherein each of the at least two sets of electromagnets is configured to be powered by a respective phase of an input electric current, the respective phases being different relative to each other.

5. The turning device according to claim 1, wherein the rotor is shaped as a disc.

6. The turning device according to claim 1, wherein the rotor is provided with holes to optimize both the rotor weight and cooling.

7. The turning device according to claim 1, wherein the rotor is configured to be directly jointed to the main shaft.

8. The turning device according to claim 1, wherein the rotor is configured to be connected to the main shaft via transmission coupling.

9. The turning device according to claim 1, wherein the rotor is made of an electrically conductive material.

10. The turning device according to claim 1, wherein the at least one first electromagnet, the at least one second electromagnet and the at least one third electromagnet are radially spaced evenly along a common radial direction of the rotor.

11. A turbomachine comprising:
a shaft; and
a turning device comprising:
a rotor connectable to the shaft and having a rotation axis and two surfaces forming opposite sides of the rotor; and
at least two sets of electromagnets connectable to an electric power source, at least one of the at least two sets of electromagnets acts on one of the two surfaces of the rotor and at least another of the at least two sets of electromagnets acts on the other of the two surfaces of the rotor, and at least one of the at least two sets of electromagnets comprises at least one first electromagnet arranged to act on a peripheral zone of one of the two surfaces of the rotor relative to the rotation axis, at least one second electromagnet arranged to act on a central zone of the one of the two surfaces of the rotor relative to the rotation axis and at least one third electromagnet arranged between the at least one first electromagnet and the at least one second electromagnet, wherein the rotor is configured to be magnetically coupled to the at least two sets of electromagnets and the at least two sets of electromagnets are arranged in proximity of the rotor in order to induce eddy currents on the two surfaces of the rotor and apply a torque to the rotor to rotate the shaft.

12. The turbomachine according to claim 11, wherein the electromagnets are configured to apply the torque along a predefined direction of rotation of the main shaft in order to accelerate the main shaft.

13. The turbomachine according to claim 11, wherein the electromagnets are configured to apply the torque opposite to a predefined direction of rotation of the main shaft in order to slow down the main shaft.

14. The turbomachine according to claim 11, wherein the rotor is shaped as a disc.

15. The turbomachine according to claim 11, wherein the rotor is provided with holes to optimize both the rotor weight and cooling.

16. The turbomachine according to claim 11, wherein the rotor is configured to be at least one of directly jointed to the main shaft or connected to the main shaft via a transmission coupling.

* * * * *